United States Patent [19]

Smith, Jr. et al.

[11] Patent Number: 5,350,498

[45] Date of Patent: Sep. 27, 1994

[54] INDUCING TILTED PERPENDICULAR ALIGNMENT IN LIQUID CRYSTALS

[75] Inventors: Willis H. Smith, Jr., Newbury Park; Hugh L. Garvin, Malibu; Klaus Robinson, Woodland Hills; Leroy J. Miller, Canoga Park, all of Calif.

[73] Assignee: Hughes Aircraft Company, Los Angeles, Calif.

[21] Appl. No.: 34,626

[22] Filed: Mar. 22, 1993

Related U.S. Application Data

[63] Continuation of Ser. No. 715,537, Jun. 14, 1991, abandoned.

[51] Int. Cl.$^5$ .............................................. C23C 14/34
[52] U.S. Cl. .......................... 204/192.23; 204/192.15; 204/192.26; 427/108; 427/167; 427/344
[58] Field of Search ....................... 204/192.15, 192.23, 204/192.26, 192.29, 298.23; 427/167, 344, 108

[56] References Cited

U.S. PATENT DOCUMENTS

| | | | |
|---|---|---|---|
| 4,022,934 | 5/1977 | Miller | 427/126 |
| 4,030,997 | 6/1977 | Miller et al. | 204/192 E |
| 4,153,529 | 5/1979 | Little et al. | 204/192 E C |
| 4,392,931 | 7/1983 | Maniv et al. | 204/192.12 |
| 4,464,134 | 8/1984 | Lackner et al. | 445/24 |
| 4,728,406 | 3/1988 | Banerjee et al. | 204/192.26 X |
| 4,851,095 | 7/1989 | Scobey et al. | 209/192.26 X |
| 5,011,267 | 4/1991 | Miller et al. | 350/340 |

FOREIGN PATENT DOCUMENTS 0184487 6/1986 European Pat. Off. .
2156860 10/1985 United Kingdom .

OTHER PUBLICATIONS

"Progress in Liquid Crystal Light Valves", W. P. Bleha, Laser Focus/Electro-Optics, Oct. 1983, pp. 111–120.

"Video–Rate Liquid–Crystal Light–Valve Using an Amorphous Silicon Photoconductor" SID 90 Digest, pp. 327–329 (1990), R. D. Sterling et al.

"Alignment of Nematic Liquid Crystals and Their Mixtures", J. Cognard, Molecular Crystals and Liquid Crystals Supplement Series, Supplement 1, pp. 64–68.

IBM Technical Disclosure Bulletin, "Liquid Crystal Alignment Film Process", vol. 28, No. 4, Sep., 1985 pp. 1563–1564.

"A New Method for Inducing Homogeneous Alignment of Nematic Liquid Crystals", M. L. Little, et al., Liquid Crystals & Ordered Fluids, vol. 3, 1978, pp. 497–511.

Primary Examiner—Nam Nguyen
Attorney, Agent, or Firm—V. D. Duraiswamy; W. K. Denson-Low

[57] ABSTRACT

A substrate (20) is treated prior to use to induce a near-perpendicular orientation of a liquid crystal director (26) relative to the substrate. A layer of silica (38) is deposited upon the substrate (20) by in-line magnetron sputtering as the substrate (20) is moved past the sputtering target (78), and the silica-coated substrate (20) is thereafter treated with a long-chain alcohol. The alcohol-treated substrate (20) is covered with a layer of liquid crystal (22), the director (26) of the liquid crystal (22) assuming a field-off state tilted about 1-3 degrees from the perpendicular toward an azimuthal direction (30) parallel to the direction of movement of the substrate (20) during deposition.

24 Claims, 3 Drawing Sheets

INDUCING TILTED PERPENDICULAR ALIGNMENT IN LIQUID CRYSTALS

This is a continuation of application Ser. No. 07/715,537 filed Jun. 14, 1991, abandoned.

BACKGROUND OF THE INVENTION

This invention relates to liquid crystals, and, more particularly, to a substrate that pre-aligns a liquid crystal layer.

One type of liquid crystal electro-optical device is constructed by placing a thin layer of liquid crystal between two transparent plates that have each been coated with a layer of an electrical conductor on its interior face. When no electric field is applied between the conductive layers, the director of the liquid crystal is in one state. (The "director" of the liquid crystal is the macroscopic direction of the long molecular axis of the liquid crystal molecules.) When an electric field is applied, the director reorients to another state. Because the liquid crystal is birefringent, the two states will have different refractive indices, and in many cases the thin layer of liquid crystal will be birefringent for light directed against the transparent plates. The state change responsive to an applied electric field is the basis for liquid crystal devices that control light, such as displays and projectors.

In its usual form, a liquid crystal light valve is a device that modulates a polarized projection light beam directed against one side of the light valve according to a writing light beam directed against the other side. The polarized projection light beam enters the light valve through one of the transparent electrodes, usually termed the counterelectrode, passes through the liquid crystal layer, and is reflected from a mirror on the other electrode. The projection light beam passes back through the liquid crystal layer and the counterelectrode, and through an external analyzer. The polarizing and analyzing functions can often be accomplished by a single polarizing beam splitter through which the projection light beam passes before and after passing through the liquid crystal. The operation of this and other types of liquid crystal light valves is discussed in greater detail in numerous technical publications, see for example "*Progress in Liquid Crystal Light Valves*", by W. P. Bleha, in Laser Focus/Electro-Optics, October 1983, pages 111–120.

In this type of liquid crystal light valve, an electric bias field is applied through the liquid crystal layer by a voltage on the conductive electrodes. The liquid crystal is oriented responsive to this electric bias field. The director of the liquid crystal is initially, in the electric field-off state, aligned perpendicular to the plates. Application of the electric field causes the director to rotate toward the plane of the plate, changing the light transmittance of the device. The writing light pattern modulates the electric field, changing the phase retardation of the light passing through the liquid crystal, which in turn modulates the projection light beam passing through the analyzer.

One problem experienced with early liquid crystal light valves was nonuniformity of the projection light modulation across the face of the liquid crystal light valve. If the director of the liquid crystal is initially perfectly perpendicular to the plane of the plates, then application of the electric field causes the director to rotate into random azimuthal positions from place to place within the cell. The response of the cell to the writing light, and thence the transmission of the cell to the projection light, therefore varies with location within the cell, an undesirable result.

A satisfactory solution to this problem is to provide a surface that aligns the director of the liquid crystal with a slight pretilt that is uniform across the liquid crystal cell. That is, if the director is initially tilted several degrees (usually about 1.5 to about 2.5 degrees) from perfectly perpendicular, all in the same azimuthal direction, the application of an electrical field causes the director to further tilt uniformly in the same direction, until it lies in the plane of the plate and everywhere in the cell points in the same direction (or azimuth).

This solution has been known for a number of years, and a number of different approaches have been proposed for providing controlled pretilt to the liquid crystal director. Some of the approaches involve nothing more than rubbing the surface of the plate with a cloth in a single direction. Others involve treating the plates with multiple steps, depositions, and treatments of the surface. These more complex approaches variously suffer from shortcomings in temperature sensitivity, sensitivity to liquid crystal decomposition products, variation in the tilt direction or the magnitude of the tilt angle, and complexity and cost.

There remains a need for an effective, relatively inexpensive approach for treating plates to induce a uniform controlled tilt in a subsequently applied liquid crystal layer. The present invention fulfills this need, and further provides related advantages.

SUMMARY OF THE INVENTION

The present invention provides a two-step treatment technique for preparing a substrate that induces a tilt to the director of a liquid crystal applied to the substrate. The tilt is from about 0.5 to about 4 degrees, and is of uniform azimuth such that the projections of the directors onto the substrate all lie approximately parallel. The treatment is stable to temperature variation.

In accordance with the invention, a method for preparing a treated substrate comprises furnishing a substrate and depositing a layer of silica on the substrate from a source of silica with the substrate moving past the source during deposition. In the preferred approach, the silica-coated substrate is thereafter treated with a long chain alcohol.

It has been found that a directional orientation is produced in a deposited silica layer by moving the substrate past a magnetton in-line sputtering source during deposition. The substrate is typically a transparent glass upon which a thin transparent layer of an electrical conductor such as indium-tin-oxide (ITO) has been previously deposited. One or more passes are typically required during silica deposition, and the resulting structure has the necessary directionality as long as the substrate moves back and forth along the same direction past the sputtering source. After the deposition of the silica layer, the silica-treated substrate is contacted with the alcohol at a sufficiently high temperature to react the alcohol with the hydroxyl groups on the surface of the silica layer. The alcohol treatment typically is made with the substrate above 100° C., and most typically 120°–160° C. After the alcohol treatment, the liquid crystal is contacted to the treated surface.

One form of device using the approach of the invention is constructed by using two similarly treated substrate electrodes, one inverted over the other, with the liquid crystal material between the two substrates. Care is taken to orient the second of the substrates so that the director of the liquid crystal is oriented in a compatible manner. In the most common situation, a compatible orientation means that the tilt direction of the liquid crystal at the surfaces of, and between, the two opposing substrates is the same. In other situations, a compatible orientation may mean that there is a controllable twist in the liquid crystal director through the thickness of the liquid crystal layer. An electric field applied between the two conductive layers of the facing substrates is used to reorient the liquid crystal director to other states.

The present invention achieves a uniformly tilted liquid crystal with a relatively inexpensive procedure that produces good uniformity of tilt and good stability. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

An objective of the preferred embodiment of the invention is to produce a treated substrate upon which a liquid crystal will self-orient so that the director of the liquid crystal will have a controlled tilt angle with respect to the surface of the substrate, with minimum azimuthal variation. A substrate 20 is illustrated schematically and generally, without showing its detail of construction, in elevation in FIG. 1 and in plan view in FIG. 2. A layer of liquid crystal 22 covers an upper surface 24 of the substrate 20.

A liquid crystal is a state of matter intermediate between that of an isotropic liquid and a solid crystal, and having some properties of each. The liquid crystal is a liquid in the sense that it is a condensed phase that is flowable. It exhibits quasi-crystalline behavior in that its long molecules may exist in an oriented arrangement wherein many molecules are aligned with respect to each other. The direction of alignment is termed the "director" of the liquid crystal.

An important characteristic of a liquid crystal is that its director can be determined in different ways, two of which are pertinent here. First, the director can be influenced by the physical surroundings of the liquid crystal. That is, the director can be established by the interaction of the molecules of the liquid crystal with a nearby solid surface. Second, the director can be influenced by an applied electric or magnetic field.

In many liquid crystal devices, an initial "field-off" director state is determined by the physical surroundings. Electrodes are provided to apply an electric field to the liquid crystal, so that the liquid crystal director is changed to a "field-on" director state as the electric field overcomes the forces that initially held the director in the field-off state and changes it to the field-on state. Because of the interaction of the liquid crystal with the surfaces, the director is most readily changed to the field-on director state in the portion of the liquid crystal 22 that is not near a constraining surface. As the field is increased, the volume of liquid crystal having the field-on director state is enlarged, until at a sufficiently high field virtually all of the liquid crystal, except possibly a thin film of one or slightly more than one monomolecular layer near the constraining surfaces, may be rotated to the field-on director state."

The significance of changing the orientation of the director of the liquid crystal is that the liquid crystal interacts with light beams that pass through it in a manner that depends upon the angle of the director relative to the transmitted light beam. The balance of forces within liquid crystals is such that the required electric field to accomplish the control of the transmitted beam is very small, so that the liquid crystal provides a projection beam control device that requires very little power.

Figure 1:
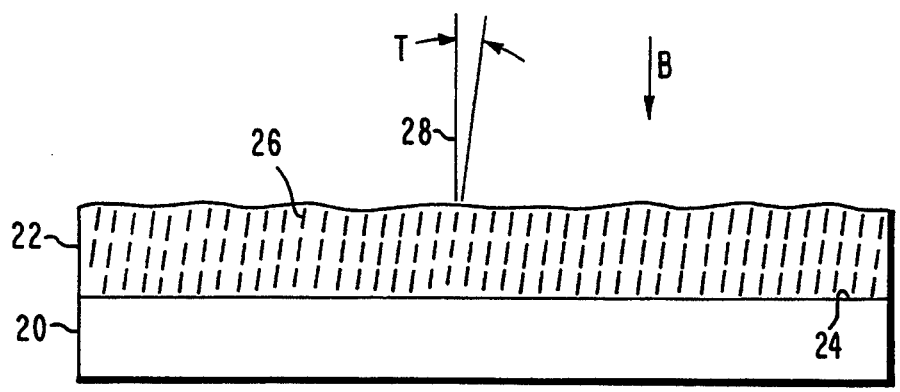
FIG. 1 is a schematic side view of a substrate that has been treated, with the electric field in the field-off state.
Figure 2:
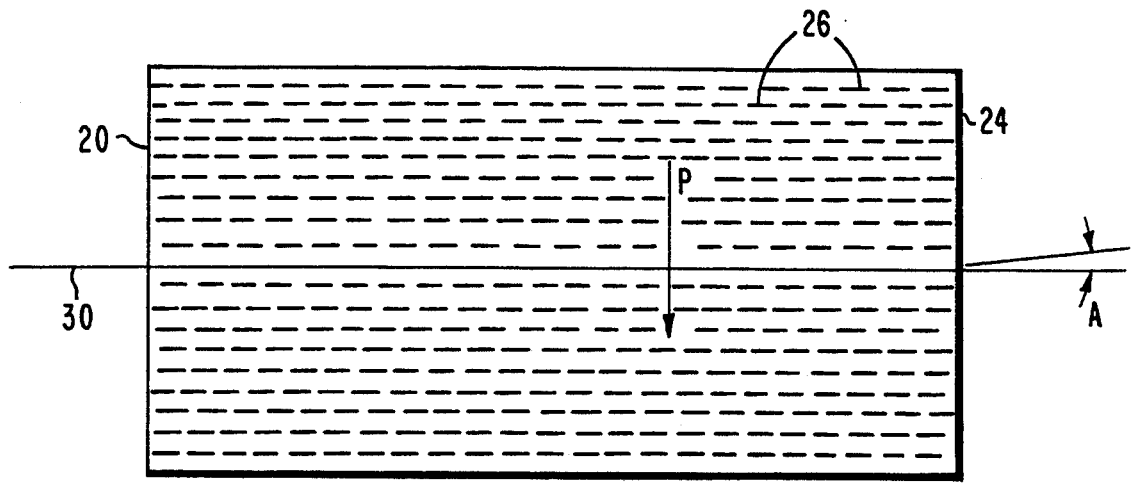
FIG. 2 is a schematic plan view of the substrate of FIG. 1, with the electric field in the field-off state.

Returning to FIG. 1, the director 26 of the liquid crystal 22 is oriented at a small tilt angle T from a line 28 that is perpendicular (or normal) to the upper surface 24 of the substrate 20. If this were the only limitation, the director at different locations on the substrate could be anywhere within a conical surface defined by the tilt angle T. However, as shown in FIG. 2, when viewed in plan view the projection of the director onto the surface of the substrate 20 is nearly parallel to an azimuthal line 30. The variation from the ideal azimuthal alignment is defined by an angle A, which is as small as possible.

Figure 3:
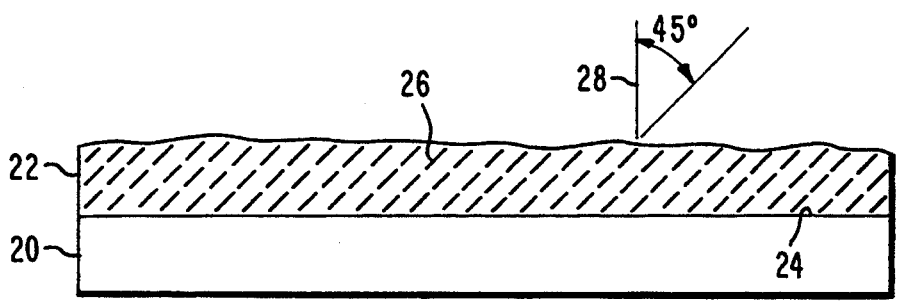
FIG. 3 is a schematic side view of the substrate of FIG. 1, with the electric field in the field-on state.

When no electric field is applied to the liquid crystal 22, the director 26 is everywhere aligned at a small tilt angle T, preferably from about 0.5 to about 4 degrees and more preferably from about 1 to about 3 degrees, from the perpendicular line 28. When a sufficiently large electric field is applied in the direction parallel to the perpendicular line 28 (that is, perpendicular to the surface 24) and the liquid crystal has a negative dielectric anisotropy, the directors 26 reorient everywhere (except possibly immediately adjacent to the constraining surfaces) to lie at an angle to the surface 24, as shown schematically in FIG. 3. The director at different locations across the surface of the liquid crystal points in substantially the same azimuthal direction 30, as shown in FIG. 2. The alignment in the azimuthal direction 30 is significant, because all of the directors across the surface have the same angle with respect to a polarization vector P of the beam B, as shown in FIG. 2. As the electric field is further increased, the director everywhere rotates to lie nearly parallel to the plane of the surface 24.

In accordance with the invention, a method for preparing a liquid crystal device comprises the steps of furnishing a substrate and depositing a layer of silica on the substrate by magnetron in-line sputtering, with the substrate moving past a silica sputtering target of the sputtering apparatus during the step of depositing. The substrate with the deposited layer of silica is then preferably treated with a long chain alcohol, and covered with a layer of liquid crystal.

Figure 4:
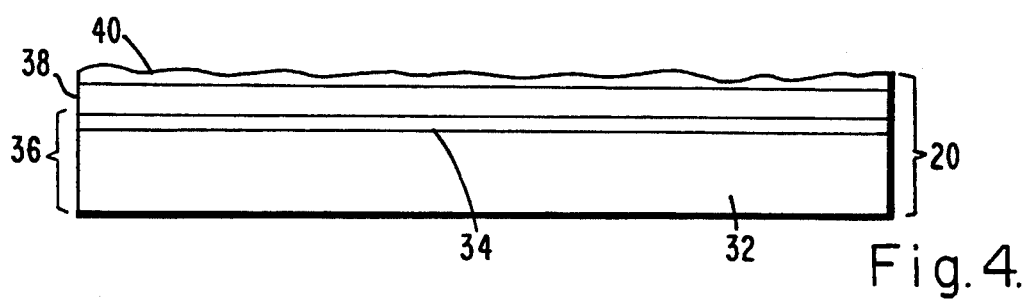
FIG. 4 is a side elevational view of a treated substrate.

The detailed structure of the substrate 20 in accordance with the present invention is illustrated in FIG. 4. The substrate 20 includes a transparent support 32, which is typically glass, such as Type BK7A glass, or quartz. Overlying the support 32 is a thin electrically conductive layer 34, which is typically indium-tin-oxide in a thickness of about 400 Angstroms. The layer 34 can support and carry a charge that creates an electric field, but is still transparent to light. The support 32 and conductive layer 34 are sometimes collectively termed the untreated substrate 36.

Overlying the untreated substrate 36 is a layer of silica 38 that is from about 12 Angstroms to about 3000 Angstroms thick, and most preferably is from about 250 Angstroms to about 1500 Angstroms thick. The silica layer may be greater than 3000 Angstroms thick and achieve proper liquid crystal orientations, but thicker layers are less desirable in operating devices because they act to insulate the underlying electrodes. The silica is oxidized silicon of the form $SiO_x$, where x generally is close to 2. The silica layer 38 is applied in a particular manner by magnetron in-line sputtering, as will be described subsequently.

After the silica layer 38 is applied, it is treated with a long-chain alcohol preferably having about 6 to 30 carbon atoms per molecule, in the manner disclosed in U.S. Pat. No. 4,464,134 whose disclosure is incorporated by reference. The preferred long chain alcohols are characterized by the formula $CH_3(CH_2)_nCH_2OH$, where n is an integer ranging from about 4 to about 28 (i.e., about 6 to about 30 carbon atoms total). Examples of such alcohols are 1-decanol, 1-dodecanol, 1-hexadecanol, 1-octadecanol, and 1-eicosanol, but the invention is not so limited. These and other suitable alcohols are readily available commercially from chemical supply houses.

An amine, preferably an aliphatic amine, can be optionally mixed with the long-chain alcohol as described in U.S. Pat. No. 4,030,997, whose disclosure is incorporated by reference. When the amine is used, it is preferred to use approximately equal molar quantities of alcohol and amine. Primary amines are preferred. Satisfactory amlnes include 1-octadecylamine, 1-hexadecylamine, 1-tetradecylamine, 1-didecylamine, dldodecylamine, tridodecylamine, N-methyloctadecylamine, and N,N-dimethyloctadecylamine, but the invention is not so limited.

The alcohol treatment is either with liquid alcohol or alcohol vapor. The preferred treatment is with alcohol vapor with the substrate and the vapor at a temperature above 100° C., and most preferably from about 120° C. to about 160° C. The treatment is readily accomplished by exposing the substrate to the vapor at this temperature for a sufficient period of time such as about two hours. as described in U.S. Pat. No. 4,464,134.

The alcohol reacts with the hydroxyl groups on the silica surface, leaving a residue that is here indicated as a layer 40. However, it should be understood that the "layer" 40 is extremely thin, and probably monomolecular in thickness. The amine catalyzes this reaction, which is believed to produce a layer of alkoxy groups chemically attached to the silicon atoms at the surface.

The silica layer is deposited by magnetron in-line sputtering, with the substrate moving past the sputtering target. Such sputtering devices are available commercially, and a satisfactory device is the model MRC 943 available from Materials Research Corporation, Orangeburg, N.Y. 10962.

Figure 5:
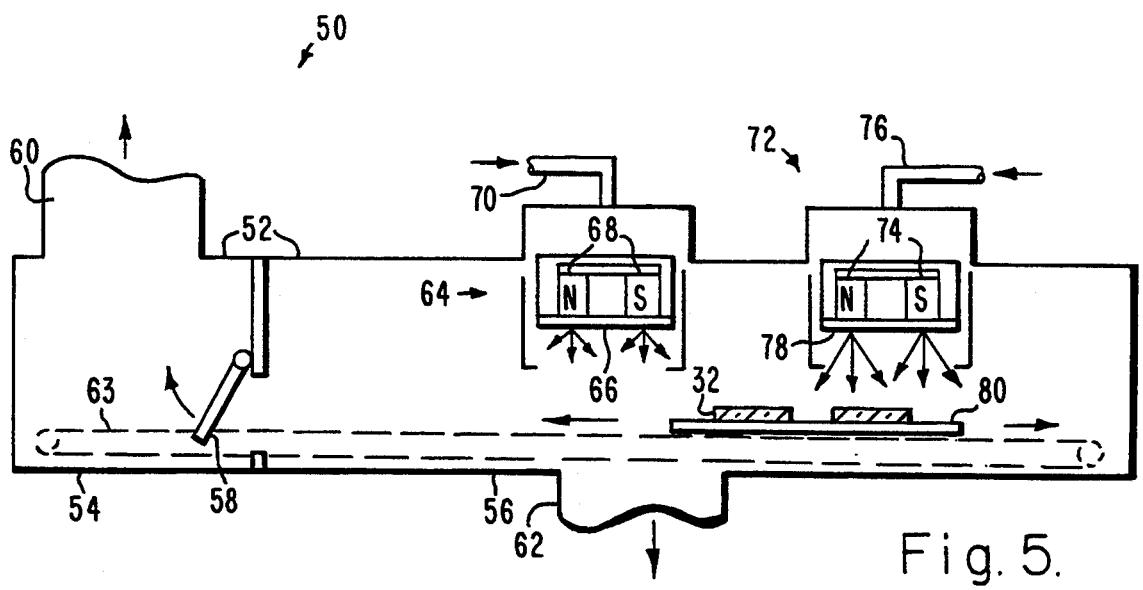
FIG. 5 is a schematic side view of a magnetron in-line sputtering apparatus.

FIG. 5 illustrates such a sputtering device 50. A vacuum chamber 52 has a loading chamber 54 and a deposition chamber 56, with a sealable lock 58 therebetween. The lock 54 and the deposition chamber 56 are separately pumped through vacuum ports 60 and 62. A traversing mechanism 63 extends from the loading chamber 54 into the deposition chamber 56. The traversing mechanism 63 moves substrates from one chamber to the other, and is also used during the deposition process in a manner to be described.

The vacuum chamber 52 has two (or more) sputtering assemblies therein, at least one to deposit a conductive layer and at least one to deposit silica. The first deposits the conductive layer 34, and the second deposits the silica layer 38. These two depositions could be accomplished in two separate devices or in one chamber to avoid the possibility of contamination of the upper surface of the conductive layer 34 that might adversely affect deposition of the silica layer 38.

A first sputtering assembly 64 is a DC magnetron sputtering device, having a target 66, magnets 68, and a DC power source 70. To deposit a preferred conductive layer 34 of an oxidized alloy of indium and tin, the target 66 is preferably indium-tin-oxide in a racetrack configuration. Sputtering is accomplished by conventional DC magnetron sputtering. Any thickness of indium-tin-oxide deposit, but typically ranging from about 400 Angstroms to about 10,000 Angstroms, is operable with this technique. During deposition of the layer 34, the traversing mechanism 63 is continuously operated in a back-and-forth mode to move the substrate past the target. The rate of movement is constant at an operator-selected speed, and the extent of travel is controlled so that the substrate clears the target at each end. The rate of movement is not critical, but is preferably about 19 centimeters per minute. The result is an evenly deposited layer 34. When deposition of the conductive layer 34 is complete, the silica layer is deposited.

Figure 6:
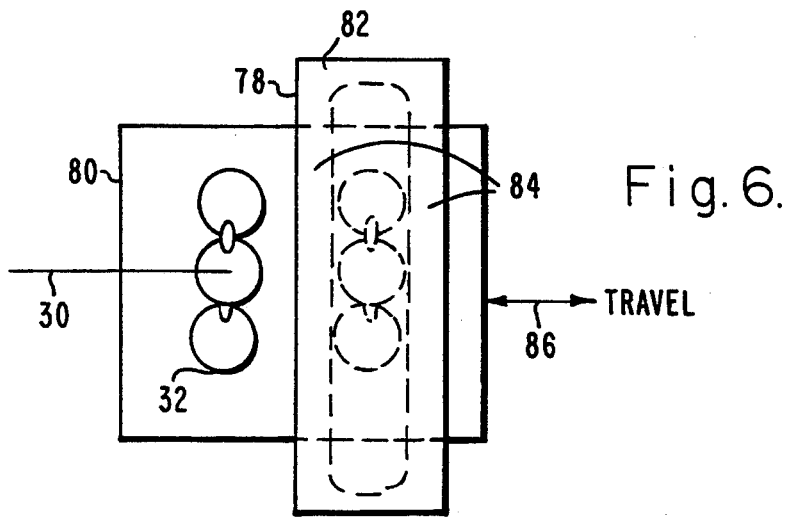
FIG. 6 is a plan view of a detail of the apparatus of FIG. 5, illustrating the relation of the magnetron sputtering target and the substrates.

A second sputtering assembly 72 is a magnetron sputtering device having magnets 74 and an rf (radio frequency) power source 76. A sputtering target 78 is silicon dioxide, $SiO_2$, in a racetrack configuration as illustrated in the plan view of FIG. 6. The racetrack target 78 is longer than the width of a pallet 80 upon which the substrates 20 are supported, with the transverse ends 82 of the target laterally separated from the ends of the substrates 20. (The target 66 preferably has a similar size and geometry.) Virtually all silica deposited upon the substrates 20 therefore comes from the sides 84 of the racetrack, which are oriented perpendicular to a direction of travel 86 of the pallet 80 on the traversing mechanism 63.

To deposit silica from the target 78, sputtering is accomplished by conventional rf magnetron sputtering. Any silica thickness from about 12 Angstroms to about 3000 Angstroms is acceptable, with a thickness of about 250 Angstroms to about 1500 Angstroms preferred. Radio frequency power levels of from about 0.2 to about 1.5 kilowatts are available in the MRC 943 unit, and a power level of about 1 kilowart is preferred.

The traversing mechanism 63 is continuously operated during deposition from the target 78 to move the substrate 20 back-and-forth past the target 78. The extent of travel is sufficient so that the substrate clears the target at the end of each traverse past the target. The traversing rate can be from about 2 centimeters per minute to about 400 centimeters per minute. With preferred conditions of a minimum distance from the target to the substrate of about 5 centimeters, a power level of 1 kilowatt, and a total 1500 Angstroms thickness of silica, one preferred traversing rate is about 19 centimeters per minute, The traversing mechanism 63 is uniformly moved at this rate between the limits of travel, at which limits it reverses. In another preferred approach, deposition has been successfully accomplished with a very low rate of movement of about 3.2 centimeters per minute, so that only one pass in one direction was required to produce a silica layer. In yet another preferred embodiment, 250 Angstroms of silica is deposited by a single pass at a rate of 19 centimeters per minute. During deposition of silica from the target 78, as well as during the deposition from the target 66, the chamber 56 is preferably back filled with a pressure of from about 3 millitorr to about 25 millitorr, preferably about 10 millitorr, of argon gas. These pressures produce acceptable quality of the deposited silica, and also permit stable plasma discharge operation of the rf magnetron sputtering apparatus.

To prepare a treated substrate, a support 32, typically of BK7A glass, is placed upon the pallet 80. The pallet 80 is placed upon the traversing mechanism 63. The various components are oriented so that the desired azimuthal line 30 on the substrate and the support 32 is parallel to the direction of travel 86. The loading chamber 54 is pumped out and backfilled with argon, and the traversing mechanism 63 is operated to move the pallet in a single pass, multiple pass in a single direction, or continuous back-and-forth motion past the first sputtering assembly 64. The electrically conductive layer 34 is deposited in the manner previously discussed. The traversing mechanism 63 is next operated to move the pallet 80 past the second sputtering assembly 72. The silica layer is deposited in the manner previously discussed. (When the liquid crystal is later contacted to the silica layer 38, the liquid crystal orients so that its projection onto the layer 38 is parallel to the direction of the relative movement, with the tilt in the direction away from the direction of travel on the last pass.)

With these parameters and a rate of movement of the pallet 80 of 19 centimeters per minute, about 250 Angstroms of silica is deposited per traverse. The most preferred thickness for the silica layer 38 is about 1500 Angstroms, requiring 6 traverses. Another approach is to utilize a rate of movement of about 3.2 centimeters per minute, which deposits a 1500 Angstrom silica layer in a single pass. Deposition may occur with movement in one direction or in both directions, where there is more than one pass.

After the desired thickness of silica is deposited, the traversing mechanism 63 is operated to return the pallet 80 to the loading chamber 54, and the silica-coated substrates are removed. The substrates are thereafter treated with alcohol or alcohol-amine mixture in the manner previously discussed.

Figure 7:
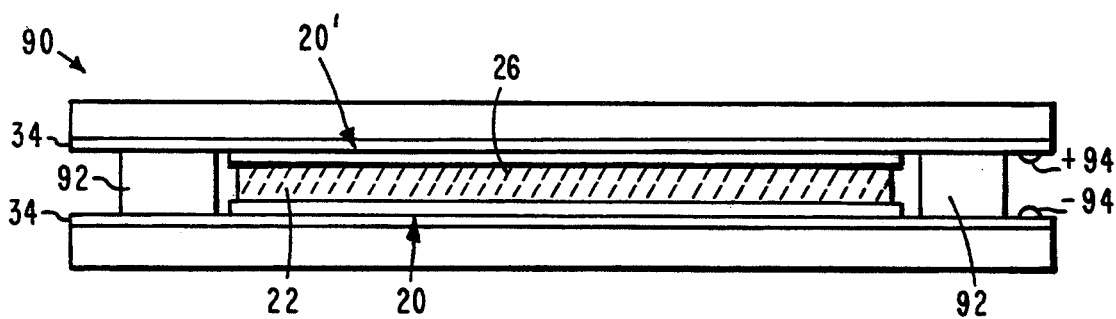
FIG. 7 is a schematic side view of a liquid crystal device.

Treated substrates are used to construct liquid crystal devices 90 such as illustrated in FIG. 7. The layer of liquid crystal 22 is placed upon the treated substrate 20. In this particular device, the liquid crystal material is one with a negative dielectric anisotropy, so that application of an electric field causes the director to orient perpendicular to the electric field. A spacer 92 is placed onto the substrate 20. The spacer 92 may be, for example, a Mylar plastic piece about 0.00025 to about 0.001 inch thick. A second treated substrate 20' is placed over the top of the first substrate 20 in an inverted orientation, resting on the spacers 92. Care is taken to orient the second substrate 20' so that the direction of tilt at this substrate relative to that at the first substrate 20 conforms to whatever type of alignment is desired. Thus, the substrate can be oriented so that there can be a twist in the liquid crystal director in the electric field-on state, proceeding from the surface of the substrate 20 to the surface of the substrate 20'. In the usual case, however, no twist is desired, and the substrates are placed so that the director is oriented everywhere the same throughout the liquid crystal layer and throughout the cell. This type of alignment is illustrated in FIG. 7, where the inclined lines schematically indicate the liquid crystal director 26, and are not cross hatching. (This type of alignment has also been discussed in U.S. Pat. No. 4,030,997 and is illustrated in FIGS. 1 and 2.). This operation is not complex, and requires only keeping track of the orientation of the substrate in the sputtering device. Electrical connection from an external voltage source (not shown) to the electrically conductive layers 34 through terminals 94 is made either before or after the device 90 is assembled.

The director of the liquid crystal material in the device 90 is uniformly aligned about 1–3 degrees from the perpendicular to the surfaces of the substrates, and within a few degrees of the selected azimuthal line, as illustrated in FIGS. 1 and 2. For a liquid crystal with a negative dielectric anisotropy, application of an increasing voltage between the terminals 94 causes the director of the liquid crystal to reorient from nearly perpendicular to the surface 24, through increasing inclinations, and to nearly parallel to the surface 24 at the highest voltages. The voltage required to orient the director nearly parallel to the plane of the substrate is a function of the thickness of the liquid crystal layer, the value of the dielectric anisotropy, and the thickness of the silica aligning layer. In most instances, the orientation of the director can be achieved with the application of an AC voltage of 5 to 30 volts at a frequency of 100 hertz to 10 kilohertz.

The alignment process and the alignment layers described above can be applied to the surface of complex, multilayer substrates specifically designed to function in a variety of ways to modulate, control, or modify either the electrical fields applied across or the light passing through the liquid crystal layer. An example of such a complex substrate is given in the article by Bleha in Laser Focus/Electro-Optics, October 1983, pages 111–120, discussed previously. A light valve substrate such as the one shown schematically in FIG. 3 of that article can consist of an optical glass substrate; a transparent conductive layer, such as indium-tin-oxide; a photosensor layer, such as cadmium sulfide, amorphous silicon, or crystalline silicon, which may also contain a variety of dopants to confer specific properties or effects; a light-blocking layer, such as cadmium telluride or a ceramic-metallic composite; and a dielectric mirror, which usually consists of alternating layers of pairs of insulating thin films differing in their refractive indices. The light valve substrate structure may also consist of electrical driver circuitry which may be based on thin film transistor or charge-coupled device circuitry. The alignment materials of this invention can be applied to the surface of such complex substrates to induce the desired tilted perpendicular alignment of the liquid crystal in contact with them.

The following examples are intended to illustrate aspects of the invention, but should not be taken as limiting the invention in any respect.

EXAMPLE 1

A device like that shown in FIG. 7 was prepared and tested. The substrates were BK7A optical glass flats. They were first cleaned by washing in acetone, scrubbing with Micro (a laboratory cleaner available from Cole-Parmer Instrument Co.), rinsing in de-ionized water, and rinsing in Transene. An electrically conductive layer of indium-tin-oxide about 400 Angstroms thick was deposited, and then the silica layer was deposited by the method discussed herein, with a traversing rate of 19 centimeters per minute. The operating conditions of the magnetron in-line sputtering apparatus were as previously described, using 1 kilowatt of rf power and a 10 millitorr argon pressure. The combination of rate of travel and operating conditions produced about 250 Angstroms of silica per pass, and there were 6 passes for a total of 1500 Angstroms of silica. The substrates were then removed from the deposition apparatus, and treated in 1-octadecanol vapor for two hours at 140° C. Unreacted alcohol was removed by washing with hexane and chloroform solvent. The device 90 was assembled as described previously, using a nematic liquid crystal having a negative dielectric anisotropy.

The device 90 was evaluated by several approaches. The tilt angle T was found to be 2.5±0.5 degrees. The thermal stability of the tilt angle T was excellent, increasing by an average of 0.01 degree per degree C. increase in temperature over the range of 23°–55° C. The alignment variation at each electrode and the resulting twist angle were measured at nine separate locations spaced 1 centimeter apart across the device. The maximum variation in the azimuthal angle A was about 8 degrees at each electrode, and the twist angle at these nine points varied by no more than 2 degrees. When an electric voltage of 6 volts was applied across the liquid crystal, there were observed no disclinations or domains, and the liquid crystal director tilted uniformly in the azimuthal direction. In theory, the transmission at the first transmission peak of the device to polarized light should be a maximum when the angle between the polarization direction P of an incident beam and the azimuthal direction 30 is 45 degrees. In the device 90, the actual measured maximum transmission at the first transmission peak occurred at an angle of 39 degrees from the direction of travel 86, in good agreement with the prediction.

EXAMPLE 2

Figure 8:
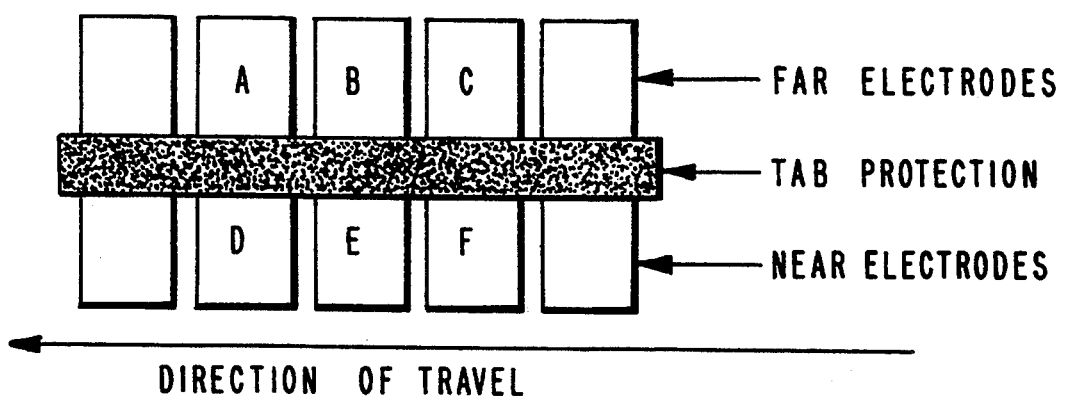
FIG. 8 is a plan view of the arrangement of electrodes during fabrication in the approach described in Example 2.

Six electrodes consisting of glass plates previously coated with a thin coating of indium-tin-oxide were placed on a stainless steel pallet and overcoated with 1500 Angstroms of silica in a single pass from right to left under the target in the MRC 943 deposition system. The speed of translation under the target was 3.2 centimeters per minute. The placement of the six electrodes, identified as electrodes A, B, C, D, E, and F, is shown in plan view in FIG. 8. The direction of travel of the pallet was from right to left as indicated by the arrow. Dummy glass plates were placed on the pallet at the ends of each row of electrodes. One end of each of the electrodes was covered with a stainless steel bar, indicated in FIG. 8 by "Tab Protection", to prevent deposition of silica on these ends. This was done to leave a tab of uncoated indium-tin-oxide, where an electrical connection could be made. Opposing electrodes were routinely paired in preparing a liquid crystal test cell (i.e., A and D, B and E, and C and F). After coating with silica, the electrodes were treated with 1-octadecanol vapor as described in Example 1.

Liquid crystal cells were prepared by facing together pairs of electrodes separated by 0.001 inch Mylar spacers, with HRL104 liquid crystal material between the electrodes. The tabs of the two electrodes in each cell were placed at the opposite ends of the cell, and the surfaces of the electrodes having the silica overcoatings faced each other, in contact with the liquid crystal. This arrangement of the electrodes caused the tilt of the liquid crystal director in each cell to be uniform throughout the cell. A mirror was attached to the outside of the cell on the side that had the "far" electrode (see FIG. 8).

Light from a projection lamp was passed through a Corning 4-64 green filter, which transmits wavelengths centered at 540 nanometers, and through a polarizer. The polarizer was oriented with the plane of polarization parallel to the direction of travel during deposition of the silica on the two electrodes, and perpendicular to the plane of polarization of the analyzer. The beam was passed through the liquid cell in a direction normal to the surfaces of the electrodes, reflected from the mirror, passed back through the liquid crystal cell in the opposite direction of travel, and through the analyzer. An electrical field was applied across the liquid crystal using a 10 kHz power source, and the voltage was increased from 0 to 15 volts rms. The test cell was rotated about an axis which coincided with the direction of light propagation, and the intensity of the light received through the analyzer was measured. The angle of cell rotation was measured for the position at which the maximum intensity at the first transmission peak was observed. In theory the maximum intensity at the first transmission peak should be observed at a rotation of 45 degrees. For the three cells, the measured angle of rotation that achieved maximum intensity at the first transmission peak was 39 degrees, 39 degrees, and 42 degrees.

This example illustrates the ability to prepare multiple electrodes simultaneously, and one approach to the pairing of electrodes in forming individual cells. It also illustrates the good degree of reproducibility that can be obtained with the approach of the invention.

EXAMPLE 3

Example 2 was repeated, except that a pair of electrodes to be paired together in making a liquid crystal cell were placed flat on the pallet but oriented with the ends of the electrodes oriented at an angle of 45 degrees to the direction of travel during silica deposition, one of the electrodes at 45 degrees clockwise and the other at 45 degrees counterclockwise. The test apparatus of Example 2 was used to determine that the maximum transmission of the first transmission peak occurred at only 3 degrees of rotation, in good agreement with the 0 degrees predicted by theory. The tilt angle of the liquid crystal was 1.8 degrees.

Another pair of electrodes was similarly prepared, except with the angle of the electrodes during silica deposition 40 degrees. The maximum transmission was measured at 5 degrees of rotation, exactly in agreement with theory. The tilt angle of the liquid crystal was measured to be 2.9 degrees from the normal.

The alignment uniformity of the two cells was evaluated with a polarizing microscope. The cell to be evaluated was placed on the microscope stage, with polarized light shining upwardly through the cell and into an analyzer in the optical system of the microscope. An electric field of 20 volts rms at 1 kHz was applied across the cell to reorient the liquid crystal director to an orientation almost parallel to the electrode surfaces. By keeping the polarizer fixed and rotating both the stage and the analyzer to find the minimum transmission settings, it was possible to determine the tilt direction at the surfaces of both electrodes. The twist in the liquid crystal alignment was the difference between the alignments at the two opposing surfaces. The measurements were made at nine points in a grid pattern across the cell, with the points spaced 1 centimeter apart. The uniformity of the alignment was described in terms of the maximum variation, or the difference between the highest and the lowest values, for the nine points. The results are presented in the following table, for the 45 degree cell ("45 cell") and the 40 degree cell ("40 cell").

| Measurement | Value in Degrees | |
| --- | --- | --- |
| | 45 cell | 40 cell |
| Tilt direction, relative to long edge of electrodes | | |
| Top surface electrode | 45.2 | 49.8 |
| Bottom surface electrode | 45.3 | 49.8 |
| Maximum variation in tilt direction | | |
| Top surface electrode | 2.8 | 2.4 |
| Bottom surface electrode | 1.8 | 1.0 |
| Maximum twist | 1.0 | 0.9 |
| Maximum variation in twist | 1.6 | 1.7 |

The measured tilt direction of the 45 degree cell was in excellent agreement with the theoretical value of 45 degrees, and the measured tilt direction of the 40 degree cell was in excellent agreement with the theoretical value of 50 degrees.

This example illustrates that the tilt direction of the liquid crystal director can be adjusted at will, using the simple expedient of orienting the electrode with respect to the relative travel direction during silica deposition. This capability is useful for certain projection systems in which it is desirable to have the plane of polarization of the projection light be parallel to one edge of a rectangular liquid crystal display cell.

EXAMPLE 4

This example illustrates the variations in the chemical structure of the alcohols that can be used to practice the invention, the variation in tilt angle obtainable by using different alcohols for the treatment, and the different tilt angles obtainable for different liquid crystals using the same alcohol.

Pairs of glass electrodes, each coated with a thin coating of indium-tin-oxide, were further overcoated with 1500 Angstroms of silica in a single right-to-left pass using the same approach described in Example 2. After silica deposition, the deposited surfaces were immersed for two hours in one of the alcohols in the following table, with the alcohol heated to 120°–160° C. and melted. The electrodes were washed free of excess alcohol in a series of washings in hexane, methanol, and chloroform. Test cells were made up as described in Example 2 using the liquid crystal HRL104 and evaluated. Following evaluation, the electrodes were separated and washed clean of the liquid crystal, reassembled with a different liquid crystal, HRL102, and again evaluated. A test prepared with 1-octadecanol vapor, as described in Example 1, was included for comparison. The liquid crystal tilt angles were measured as in Example 1, with the following results:

| Alcohol | No. of Carbons | Tilt angle, degress | |
| --- | --- | --- | --- |
| | | HRL 104 | HRL 102 |
| 1-Dodecanol | 12 | 1.5 | 2.4 |
| 1-Octadecanol | 18 | — | 2.2 |
| 1-Triacontanol | 30 | 1.1 | 1.1 |
| 2-Hexadecanol | 16 | 2.6 | 3.7 |
| 1,2-Octadecanediol | 18 | 0.2 | 0.6 |
| Cholesterol | 27 | 2.7 | 3.1 |

The first three alcohols in the table are straight chain primary alcohols of the type usually preferred for the practice of the invention. 2-Hexadecanol is a secondary alcohol with a chain of 15 carbons plus a methyl substituent on the alpha carbon. 1,2-Octadecanediol is an alcohol with two hydroxyl groups, one a primary hydroxyl group and the other a secondary hydroxyl group. It has a chain of 17 carbon atoms attached to the secondary hydroxyl group. The tilt angles obtained with this long chain diol were small, but treatment with mixtures of this alcohol and another alcohol could be performed to obtain intermediate tilt angles. Cholesterol is an optically active, alicylic alcohol which has a double bond in one of the rings.

EXAMPLE 5

This example demonstrated that silica coatings as thin as 250 Angstroms thick can be used to induce liquid crystal alignment, and that the electrodes need not be washed with solvent after the alcohol treatment. Other studies have indicated that coatings as thin as about 12 Angstroms can induce such alignment.

Two pairs of electrodes with thin indium-tin-oxide coatings on glass were overcoated with silica as described in Example 1, except that only one pass to deposit 250 Angstroms of silica was made. After deposition of the silica, the electrodes were treated with 1-octadecanol vapor as in Example 1. After the treatment, one pair of electrodes was washed with hexane, methanol, and chloroform, and the other pair was unwashed. Each pair was assembled into a test cell using liquid crystal HRL104. The tilt angles for the washed and unwashed electrode cells was 2.82 and 3.55 degrees, respectively.

EXAMPLE 6

Some liquid crystal mixtures will spontaneously assume a tilted perpendicular alignment on the silica-coated surfaces prepared according to the process of the invention, even without the subsequent alcohol treatment. The quality of the alignment is not as good as that achieved with the alcohol treatment.

Two pairs of electrodes with thin indium-tin-oxide coatings were coated with 1500 Angstroms of silica in a single right-to-left pass at 3.2 centimeters per minute. The electrodes were used to prepare liquid crystal cells, without any alcohol treatment. A thickness of 0.001 inches of the commercial liquid crystal formulation ZLI2857, available from E. Merck, was used in one cell and HRL104 liquid crystal in the other. Both liquid crystals spontaneously assumed a tilt, measured to be 3.0 degrees for the ZLI2857 liquid crystal cell and 3.1 degrees for the HRL104 liquid crystal cell. Measurements were made at nine locations across the cell, following the same procedure as in Example 4. The results for the two liquid crystals are

| Measurement | Value in Degrees | |
|---|---|---|
| | ZLI2857 | HRL104 |
| Maximum variation in tilt direction | | |
| Top surface electrode | 20.5 | 34.2 |
| Bottom surface electrode | 17.4 | 27.4 |
| Maximum variation in twist | 3.7 | 8.7 |

Comparing these results with those of Example 3, the alcohol treatment leads to much better uniformity than when no alcohol treatment is used.

EXAMPLE 7

A liquid crystal test cell was fabricated from electrodes that were overcoated with silica but were not treated with an alcohol, as in Example 6. The liquid crystal used for Example 7 was the commercial liquid crystal BDH-E7, available from British Drug House. This liquid crystal aligned with its director essentially parallel to the surfaces of the electrodes, but the alignment is not uniform throughout the cell. Instead, at each point in the cell the liquid crystal adopted the alignment it possessed at the moment when it first contacted the surfaces and flowed through the cell, as determined by visual inspection with a polarizing microscope.

This example illustrates a significant difference between the present approach and other known methods for achieving a tilted perpendicular alignment. Other methods combine a technique that produces a uniform homogeneous or surface parallel alignment with a technique that produces a homeotropic or surface perpendicular alignment. By contrast, if the process of this invention is practiced without the alcohol treatment and a liquid crystal is used that aligns parallel to the silica surfaces, the alignment is completely non-uniform. The structure of the silica surface produced by the present approach fails to enforce uniformity in the direction of alignment in a homogeneous or surface parallel alignment. The silica surface produced by the process of the present invention is substantially different from the surfaces involved in other methods of inducing tilted perpendicular alignment.

EXAMPLE 8

The approach of the present invention was utilized to obtain alignment of liquid crystals on liquid crystal light valve substrates. The type of substrates as utilized in a light valve device are described in the publication of Rodney D. Sterling, Robert D. Te Kolste, Joseph M. Haggerty, Thomas C. Borah, and William P. Bleha, "Video-Rate Liquid-Crystal Light-Valve Using an Amorphous Silicon Photoconductor" SID 90 Digest, pages 327-329 (1990). One substrate in the device has a quartz window with an overlying indium-tin-oxide conductive layer, an amorphous silicon photoconductor photosensor, and a dielectric mirror. The other is a quartz window with an overly ing indium-tin-oxide layer. In each case, a silica layer was deposited and the silica layer was treated with alcohol using the preferred approaches discussed herein. Excellent, uniform tilted alignment was achieved.

The results obtained with this approach are technically superior to those obtained by other procedures, and in many cases less costly. The origin of the alignment properties of the present invention are not known with certainty, but they definitely arise from the deposition of silica with simultaneous relative movement between the deposition target and the substrate. No other prior techniques are known using such relative motion to achieve a tilted perpendicular liquid crystal alignment.

The approach of the invention was compared with the best prior techniques known to the inventors. The procedure of U.S. Pat. No. 4,030,997 resulted in greater variation in the tilt direction and greater sensitivity to temperature. The deposition procedure of J. Cognard, "Mol. Cryst. Liq. Cryst. Supp. Ser.", Suppl 1, 1-74 (1982) produces greater tilt variation and less predictability, and is also much more complex and expensive to perform. The low angle $SiO_x$ deposition described by J. Cognard in the same publication produces too high a tilt angle to be useful.

The present invention provides an advance in the art of liquid crystal devices. Although particular embodiments of the invention have been described in detail for purposes of illustration, various modifications may be made without departing from the spirit and scope of the invention. Accordingly, the invention is not to be limited except as by the appended claims.

What is claimed is:

1. A method for preparing a treated substrate to produce tilted perpendicular alignment of a liquid crystal on the substrate, wherein the liquid crystal is comprised of elongated molecules whose combined long molecular axes define a macroscopic director, with both tilt angle and tilt direction of the director being substantially uniform, predictable, and controllable, comprising the steps of:

moving a substrate past a source of silica;

depositing a layer of silica on the substrate from the source of silica as the substrate is moved past the source during deposition;

treating the silica-coated substrate with a long-chain alcohol; and covering the substrate with a layer of liquid crystal, the director at all points across the surface of the substrate having an azimuthal direction that is substantially uniform, such that projection of the director onto the substrate surface is everywhere approximately parallel.

2. The method of claim 1, wherein the substrate is made of glass or quartz.

3. The method of claim 1, wherein the substrate is a liquid crystal light valve substrate.

4. The method of claim 1, wherein the substrate has an electrically conductive coating thereupon prior to the step of moving.

5. The method of claim 1, wherein the step of depositing ls accomplished in a plurality of passes of the substrate past the source.

6. The method of claim 1, wherein the step of depositing is accomplished in a single pass of the substrate past the source.

7. The method of claim 1, wherein the step of treating is accomplished with the substrate at a temperature of from about 120° C. to about 160° C.

8. The method of claim 1, wherein the alcohol is selected from the group consisting of a long chain aliphatic alcohol of the form $CH_3(CH_2)_nCH_2OH$, where n ranges from about 4 to about 28, 2-hexadecanol, 1,2-octadecanediol and cholesterol.

9. The method of claim 8, wherein an amine is mixed with the alcohol.

10. The method of claim 8, wherein said long chain aliphatic alcohol is selected from the group consisting of 1-decanol, 1-dodecanol, 1-hexadecanol, 1-octadecanol, 1-eicosanol, and 1-triacontanol.

11. The method of claim 1, wherein the source of silica includes a sputtering target.

12. The method of claim 1, wherein the source of silica is a magnetron sputtering target.

13. The method of claim 1 wherein the substrate is substantially uniformly moved past the source of silica in linear motion.

14. A method for preparing a liquid crystal device havig a tilted perpendicular alignment of liquid crystal on the substrate, wherein the liquid crystal is comprised of elongated molecules whose combined long molecular axes define a macroscopic director, with both tilt angle and tilt direction of the director being substantially uniform, predictable, and controllable, comprising the steps of:
   moving a substrate past a source of silica;
   depositing a layer of silica on the substate by magnetron in-line sputtering from the source of silica as the substrate is moved past the source during deposition;
   treating the silica-coated substrate with a long chain alcohol; and
   covering the alcohol-treated substrate with a layer of liquid crystal, the director at all points across the surface of the substrate having an an azimuthal direction that is substantially uniform, such that projection of the director onto the substrate surface is everywhere approximately parallel.

15. The method of claim 14, wherein the substrate is glass coated with a layer of an electrically conductive material thereon.

16. The method of claim 14, wherein the thickness of the layer of silica is from about 12 Angstroms to about 3000 Angstroms.

17. The method of claim 14, wherein the liquid crystal is selected from the group consisting of a nematic, a cholesteric, and a smectic liquid crystal.

18. The method of claim 14 wherein the substrate is a liquid crystal light valve substrate.

19. The method of claim 14 wherein the substrate is substantially uniformly moved past the source of silica in linear motion.

20. A method for preparing a treated substrate to produce tilted particular alignment of a liquid crystal on the substrate, wheein the liquid crystal is comprised of elongated moelcules whose combiend long molecular axes define a macroscopic director, with both tilt angle and tilt direciton of the director being substantilly uniform, predictable, and controllable, comprising the steps of:
   moving a substrate past a source of silica;
   depositing a layer of silica on the substrate from the source of silica as the substrate is moved past the source during deposition; and
   covering the substrate with a layer of liquid crystal having the property of spontaneously aligning with the director substantially perpendicular to the substrate surface, the director at all points across the surface of the substrate having an azimuthal direction that is substantially uniform, such that projection of the director onto the substrate surface is everywhere approximately parallel.

21. The method of claim 20 wherein said substrate is a member selected from the group consisting of glass, quartz, and a liquid crystal light valve substrate.

22. The method of claim 20 wherein said substrate is provided with an electrically conductive coating prior to the step of moving.

23. The method of claim 20 wherein the step of depositing is accomplished in at least one pass of said substrate past said source.

24. The method of claim 20 wherein the step of treating is accomplished with said substrate at a temperature of about 120° to 160° C.

* * * * *

UNITED STATES PATENT AND TRADEMARK OFFICE
CERTIFICATE OF CORRECTION

PATENT NO. : 5,350,498
DATED : September 27, 1994
INVENTOR(S) : W. H. SMITH, JR. ET AL It is certified that error appears in the above-identified patent and that said Letters Patent is hereby corrected as shown below:

Col. 14,
Claim 5, line 2, delete "1s" and insert instead --is--.
Col. 15,
Claim 14, line 2, delete "havig" and insert instead --having--.

line 18, delete the second occurrence of "an."
Col. 16,
Claim 20, line 2, delete "particular" and insert instead
              --perpendicular--;

line 3, delete "wheein" and insert instead --wherein--;

line 4, delete "moelcules" and insert instead
              --molecules--;

line 4, delete "combiend" and insert instead
              --combined--; and line 6, delete "direciton" and insert instead
              --direction--.

Signed and Sealed this

Twelfth Day of September, 1995

*Attest:*

BRUCE LEHMAN

*Attesting Officer*    *Commissioner of Patents and Trademarks*